US011750522B2

(12) United States Patent
Wu et al.

(10) Patent No.: US 11,750,522 B2
(45) Date of Patent: Sep. 5, 2023

(54) SYSTEM AND METHOD FOR REDUCING CONGESTION IN A NETWORK

(71) Applicant: Avago Technologies International Sales Pte. Limited, Singapore (SG)

(72) Inventors: Kenny Wu, San Jose, CA (US); James Winston Smart, Irvine, CA (US); Mark Karnowski, Irvine, CA (US); Ravi Shenoy, San Jose, CA (US); Gregorio Gervasio, Jr., San Jose, CA (US); Lalit Chhabra, San Jose, CA (US); Chakradhara Raj Yadav Aradhyula, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 13 days.

(21) Appl. No.: 17/234,223

(22) Filed: Apr. 19, 2021

(65) Prior Publication Data

US 2022/0337524 A1  Oct. 20, 2022

(51) Int. Cl.
*H04L 12/815* (2013.01)
*H04L 47/22* (2022.01)

(52) U.S. Cl.
CPC .................................. *H04L 47/225* (2013.01)

(58) Field of Classification Search
CPC .................................................... H04L 47/225
See application file for complete search history.

(56) References Cited

U.S. PATENT DOCUMENTS

| | | | | |
|---|---|---|---|---|
| 5,935,220 A | * | 8/1999 | Lumpkin | G06F 13/126 710/48 |
| 6,831,916 B1 | * | 12/2004 | Parthasarathy | H04L 12/66 370/359 |
| 7,668,177 B1 | * | 2/2010 | Trapp | H04L 12/40032 370/395.42 |
| 9,223,563 B2 | * | 12/2015 | Stenfort | G06F 8/654 |
| 2007/0055824 A1 | * | 3/2007 | Diefendorff | G06F 12/1027 711/137 |
| 2008/0082736 A1 | * | 4/2008 | Chow | G06F 12/0246 711/E12.001 |
| 2009/0063787 A1 | * | 3/2009 | Gower | G06F 13/1668 711/149 |

(Continued)

OTHER PUBLICATIONS

Extended European Search Report on EP Appln 22167892.3 dated Aug. 5, 2022.

*Primary Examiner* — Atique Ahmed
(74) *Attorney, Agent, or Firm* — Foley & Lardner LLP

(57) ABSTRACT

Systems and methods of communicating in a network use rate limiting. Rate limiting units (either receive side or transmit side) can perform rate limiting in response to a) a maximum number of bytes that can be solicited over a first period of time is exceeded, b) a maximum number of bytes that are outstanding over a second period of time is exceeded; or c) a maximum number of commands that are outstanding over a period of time is exceeded as part of CMD_RXRL. The CMD_RXRL can have three components (a) max bytes, b) outstanding bytes, c) outstanding commands. TXRL contains the component of max bytes or maximum number of bytes that can be transmitted over a third period of time to match the speed of a receive link, or any node or link through the network/fabric.

21 Claims, 5 Drawing Sheets

(56) References Cited

U.S. PATENT DOCUMENTS

| | | | |
|---|---|---|---|
| 2009/0190427 A1* | 7/2009 | Brittain | G11C 5/143 365/212 |
| 2010/0269021 A1* | 10/2010 | Gower | G06F 11/10 714/764 |
| 2015/0078395 A1* | 3/2015 | Nishimura | H04L 47/32 370/412 |
| 2019/0042110 A1* | 2/2019 | Bharadwaj | G06N 20/00 |
| 2019/0342217 A1* | 11/2019 | Mazurek | H04L 47/12 |

* cited by examiner

SYSTEM AND METHOD FOR REDUCING CONGESTION IN A NETWORK

FIELD OF THE DISCLOSURE

This disclosure generally relates to computer networking, storage networking and communications. Some embodiments of the present disclosure are related to systems and methods for reducing congestion in networks.

BACKGROUND OF THE DISCLOSURE

In the last few decades, the market for network communications devices has grown by orders of magnitude, fueled by the use portable devices, and increased connectivity and data transfer between all manners of devices. Digital switching techniques have facilitated the large scale deployment of affordable, easy-to-use communication networks including storage networks (e.g., storage area networks (SANs)). Wireless communication may operate in accordance with various standards such as IEEE 802.11x, IEEE 802.11ad, IEEE 802.11ac, IEEE 802.11n, IEEE 802.11ah, IEEE 802.11aj, IEEE 802.16 and 802.16a, Bluetooth, global system for mobile communications (GSM), code division multiple access (CDMA), and cellular technologies.

SANs connect computer data storage to servers in commercial data centers. SANs can use a Fibre Channel (FC) protocol which is a high-speed data transfer protocol providing in-order, lossless delivery of raw block data. When a network node or link is carrying more data than it can handle, that link creates congestion in the network resulting in overall reduced network throughput (e.g., for other fabric devices, such as, fibre channel HBAs or storage adapters, ethernet converged network adapters (CNA), security adapters, or other communication devices). Standards can provide protocols for reducing or preventing congestion on the network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF EMBODIMENTS

Figure 1A:
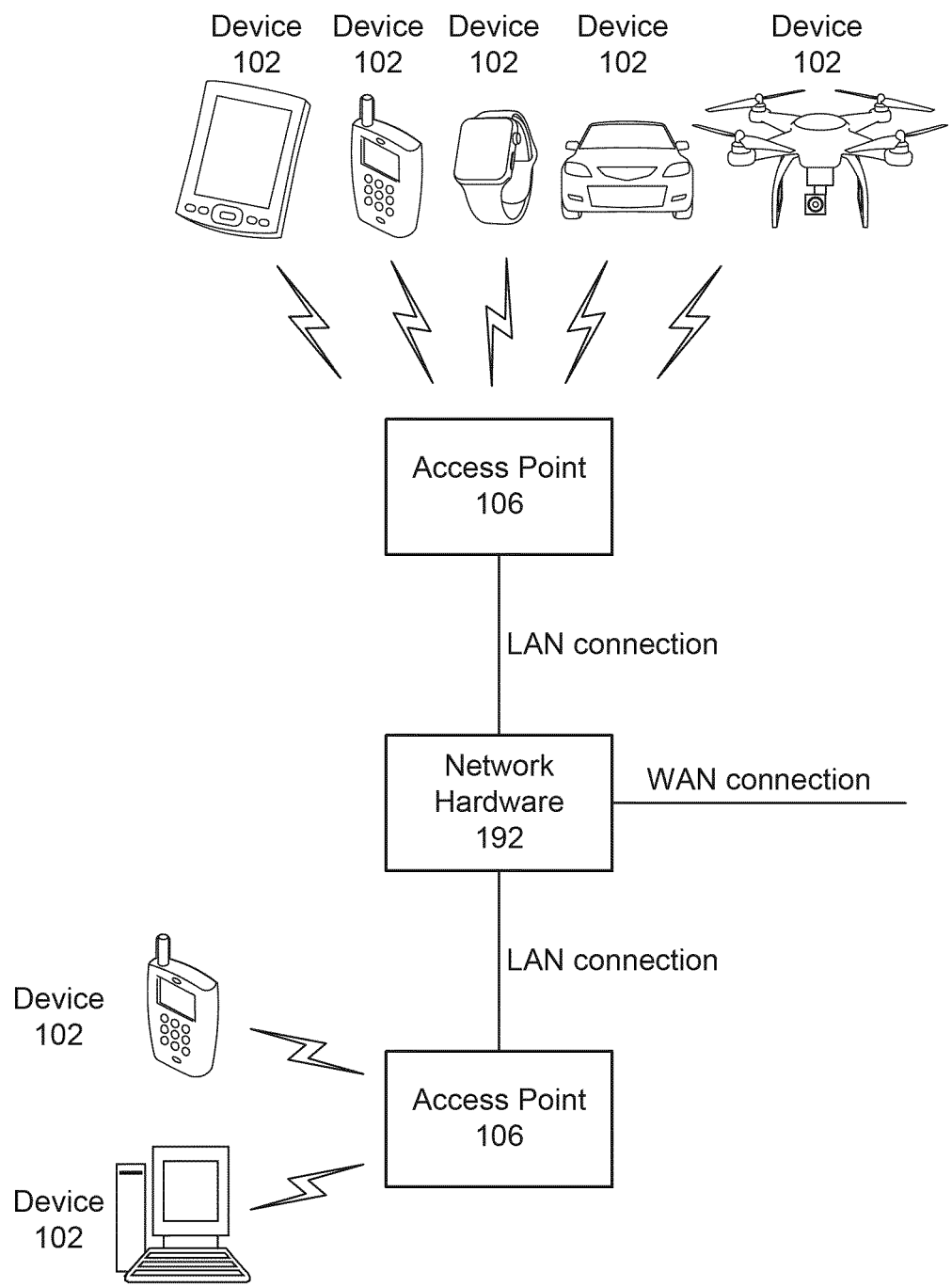
FIG. 1A is a block diagram depicting an embodiment of a network environment including one or more access points in communication with one or more wireless devices or stations.

The following IEEE standard(s), including any draft versions of such standard(s), are hereby incorporated herein by reference in their entirety and are made part of the present disclosure for all purposes IEEE 802.3, IEEE 802.11x, IEEE 802.11ad, IEEE 802.11ah, IEEE 802.11aj, IEEE 802.16 and 802.16a, and IEEE 802.11ac. In addition, although this disclosure may reference aspects of these standard(s), the disclosure is in no way limited by these standard(s). Some standards may relate to storage area networks (SANs) for connecting computer data storage to servers in commercial data centers. SANs can use a Fibre Channel (FC) standard/protocol, small computer system interface (SCSI) interface standard/protocol, asynchronous transfer mode (ATM) protocol, and synchronous optical networking protocol (SONET), all of which are incorporated herein by reference in their entireties.

For purposes of reading the description of the various embodiments below, the following descriptions of the sections of the specification and their respective contents may be helpful. Section A describes a network environment and computing environment which may use data from SANs practicing embodiments described herein, and Section B describes embodiments of systems for and method for congestion relief in a network (e.g., a SAN). Some embodiments of the systems and methods can utilize exchange rate-limiting in a network without blocking. Some embodiments achieve advantages of reduced traffic congestion in the network, improved overall throughput in the system, reduced CPU utilization without requiring host CPU/software/driver intervention, and reduced impacts of speed mismatches in the network.

Some embodiments relate to a method of communicating in a network. Read commands are provided via the network from a local transmit port. The read commands request data to be received on a local receive port via the network. The method includes providing a command to a rate limiting unit, and providing the command to the local transmit port unless the rate limiting unit determines a maximum number of bytes that can be solicited over a first period of time is exceeded if the command is provided.

Some embodiments relate to a method of communicating in a network. The method includes providing the command to the local transmit port unless a rate limiter determines a maximum number of bytes that are outstanding over a second period of time is exceeded if the command is provided. In some embodiments, the rate limiter determines the maximum number of bytes that are outstanding over the second period of time is exceeded using hysteresis. In some embodiments, the method is performed on a host bus adapter disposed at least in part on an application specific circuit (ASIC).

Some embodiments relate to a host bus adapter for a storage network. The host bus adapter includes a rate limiting unit configured to perform rate limiting in response to:

a) a maximum number of bytes that can be solicited over a first period of time being exceeded; or b) a maximum number of bytes that are outstanding over a second period of time being exceeded.

In some embodiments, the rate limiting unit is configured to perform rate limiting in response to:

a) a maximum number of bytes that can be solicited over a first period of time being exceeded; and b) a maximum number of bytes that are outstanding over a second period of time being exceeded.

Some embodiments relate to a host bus adapter for a storage network, the host bus adapter includes a rate limiting unit comprising a receive rate limiter and a transmit rate limiter. The receive rate limiter is configured to perform receive rate limiting in response to:

a) a maximum number of bytes that can be solicited over a first period of time being exceeded; or
b) a maximum number of bytes that are outstanding over a second period of time being exceeded.

The transmit rate limiter is configured to perform transmit rate limiting in response to maximum number of bytes that can be transmitted over a third period of time matching or exceeding a speed of any node or link through the network/fabric.

Some embodiments relate to a host bus adapter for a storage network. The host bus adapter includes a rate limiting unit comprising a transmit rate limiter. The transmit rate limiter is configured to perform transmit rate limiting in response to maximum number of bytes that can be transmitted over a third period of time matching or exceeding a speed of a receive link any node or link through the network/fabric.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. The network include or be in communication with a SAN, security adapters, or ethernet CNA. In brief overview, the network environment includes a wireless communication system that includes one or more access points 106, one or more wireless communication devices 102 and a network hardware component 192. The wireless communication devices 102 may for example include laptop computers 102, tablets 102, personal computers 102, wearable devices 102, vehicles 102 (e.g., automobiles, drones, smart vehicles, robotic units, etc.) and/or cellular telephone devices 102. The details of an embodiment of wireless communication devices 102 and/or access point 106 are described in greater detail with reference to FIGS. 1B and 1C. The network environment can be an ad hoc network environment, an infrastructure wireless network environment, a wired network coupled to a wireless network, a subnet environment, etc. in one embodiment The access points (APs) 106 may be operably coupled to the network hardware 192 via local area network connections. The network hardware 192, which may include a router, gateway, switch, bridge, modem, system controller, appliance, etc., may provide a local area network connection for the communication system. Each of the access points 106 may have an associated antenna or an antenna array to communicate with the wireless communication devices in its area. The wireless communication devices may register with a particular access point 106 to receive services from the communication system (e.g., via a SU-MIMO or MU-MIMO configuration). For direct connections (i.e., point-to-point communications), some wireless communication devices may communicate directly via an allocated channel and communications protocol. Some of the wireless communication devices 102 may be mobile or relatively static with respect to the access point 106.

In some embodiments an access point 106 includes a device or module (including a combination of hardware and software) that allows wireless communication devices 102 to connect to a wired network using Wi-Fi, or other standards. An access point 106 may sometimes be referred to as a wireless access point (WAP). An access point 106 may be configured, designed and/or built for operating in a wireless local area network (WLAN). An access point 106 may connect to a router (e.g., via a wired network) as a standalone device in some embodiments. In other embodiments, an access point 106 can be a component of a router. An access point 106 can provide multiple devices access to a network. An access point 106 may, for example, connect to a wired Ethernet connection and provides wireless connections using radio frequency links for other devices 102 to utilize that wired connection. An access point 106 may be built and/or configured to support a standard for sending and receiving data using one or more radio frequencies. Those standards, and the frequencies they use may be defined by the IEEE (e.g., IEEE 802.11 standards). An access point 106 may be configured and/or used to support public Internet hotspots, and/or on an internal network to extend the network's Wi-Fi signal range.

In some embodiments, the access points 106 may be used for in-home or in-building wireless networks (e.g., IEEE 802.11, Bluetooth, ZigBee, any other type of radio frequency based network protocol and/or variations thereof). Each of the wireless communication devices 102 may include a built-in radio and/or is coupled to a radio. Such wireless communication devices 102 and/or access points 106 may operate in accordance with the various aspects of the disclosure as presented herein to enhance performance, reduce costs and/or size, and/or enhance broadband applications. Each wireless communication devices 102 may have the capacity to function as a client node seeking access to resources (e.g., data, and connection to networked nodes such as servers) via one or more access points.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 1B:
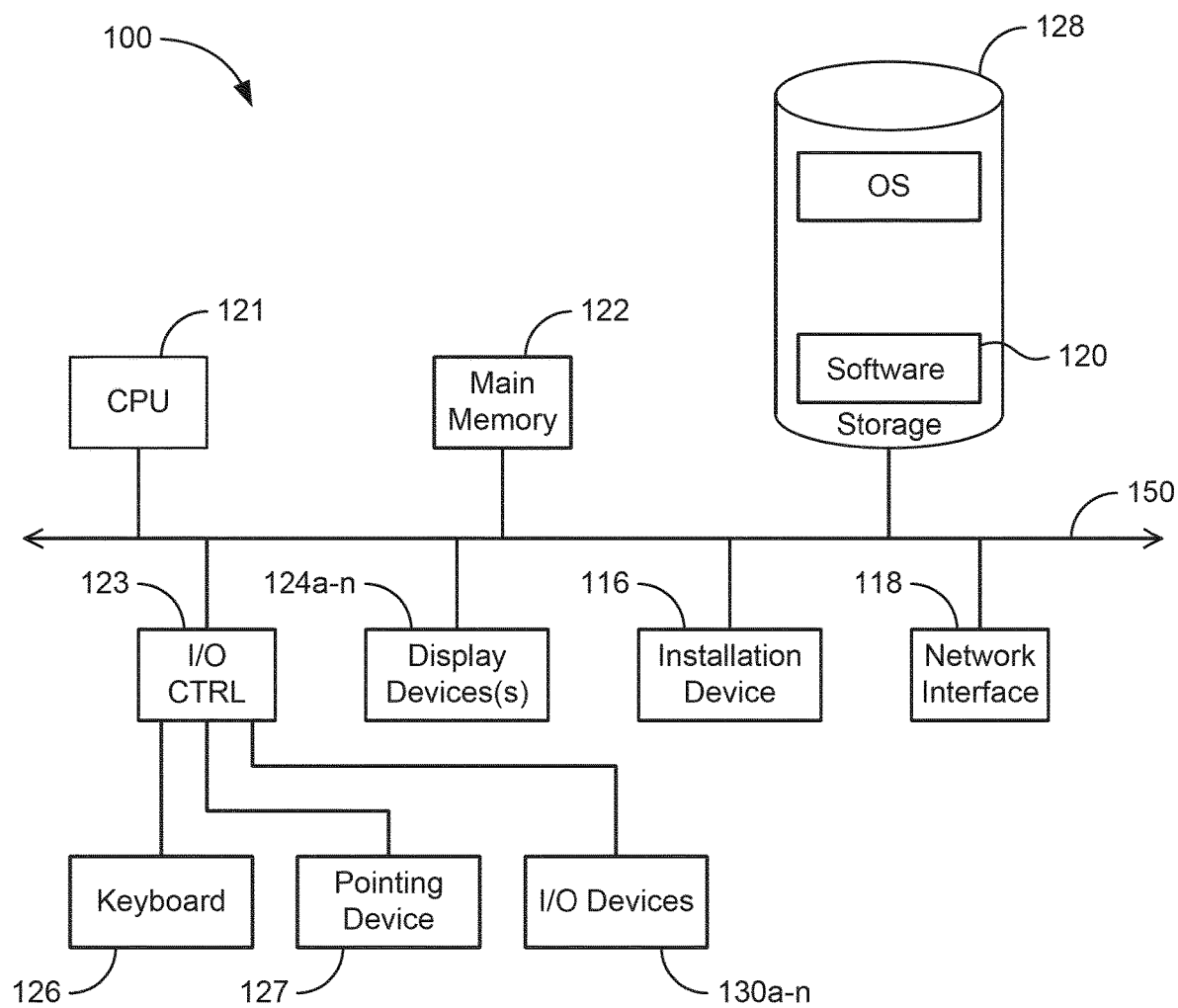
FIGS. 1B and 1C are block diagrams depicting embodiments of computing devices useful in connection with the methods and systems described herein.
Figure 1C:
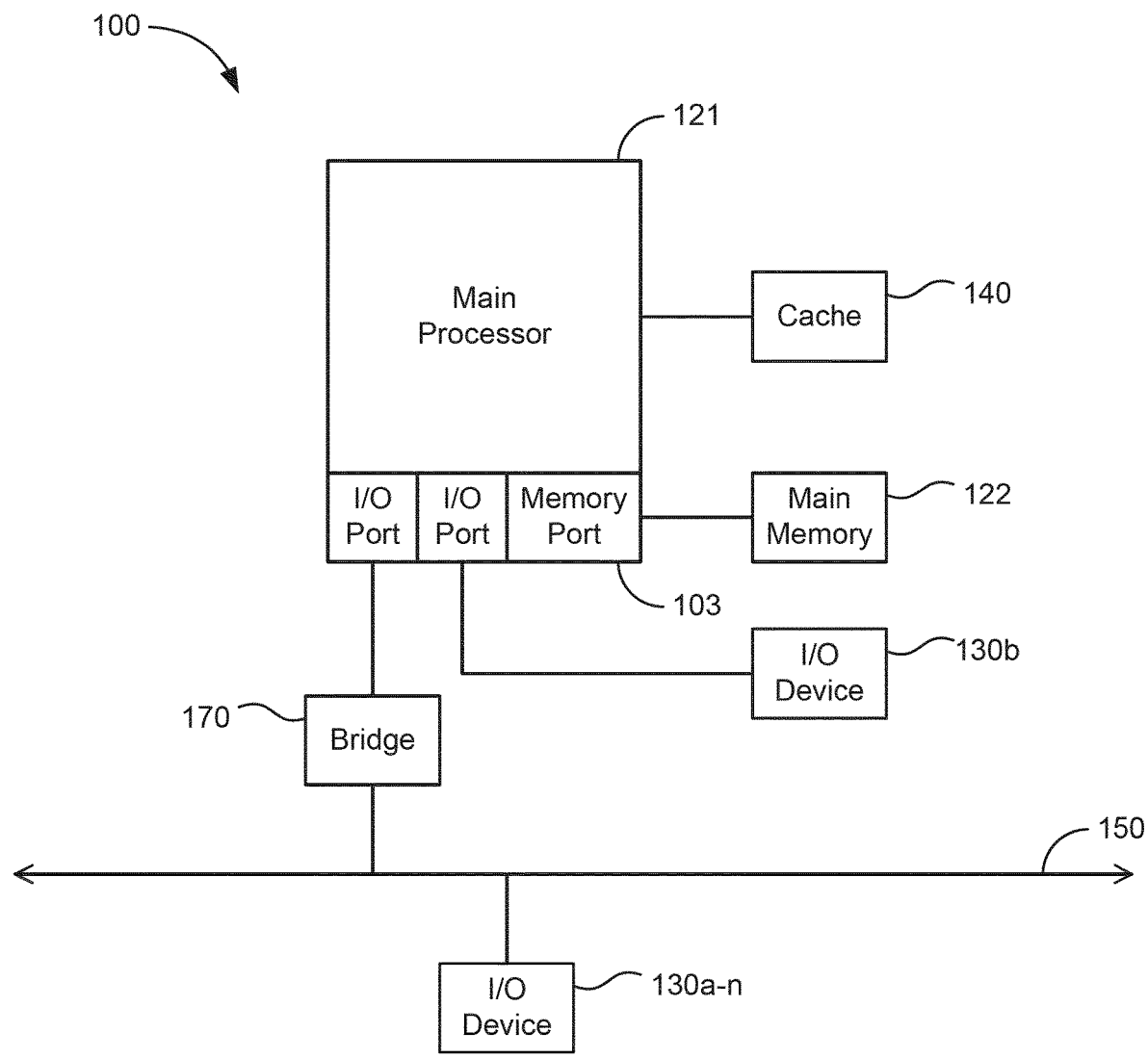

The communications device(s) 102 and access point(s) 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication device 102 or access point 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer or computer system 100 in which the main processor 121 may communicate directly with I/O device 130b, for example via HYPER-TRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 may further include a storage device, such as one or more hard disk drives or redundant arrays of independent disks, for storing an operating system and other related software, and for storing application software programs such as any program or software 120 for implementing (e.g., software 120 configured and/or designed for) the systems and methods described herein. Optionally, any of the installation devices 116 could also be used as the storage device. Additionally, the operating system and the software can be run from a bootable medium.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may include or be connected to one or more display devices 124a-124n. As such, any of the I/O devices 130a-130n and/or the I/O controller 123 may include any type and/or form of suitable hardware, software, or combination of hardware and software to support, enable or provide for the connection and use of the display device(s) 124a-124n by the computing device 100. For example, the computing device 100 may include any type and/or form of video adapter, video card, driver, and/or library to interface, communicate, connect or otherwise use the display device(s) 124a-124n. In one embodiment, a video adapter may include multiple connectors to interface to the display device(s) 124a-124n. In other embodiments, the computing device 100 may include multiple video adapters, with each video adapter connected to the display device(s) 124a-124n. In some embodiments, any portion of the operating system of the computing device 100 may be configured for using multiple displays 124a-124n. One ordinarily skilled in the art will recognize and appreciate the various ways and embodiments that a computing device 100 may be configured to have one or more display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device or system 100 of the sort depicted in FIGS. 1B and 1C may operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein. Aspects of the operating environments and components described above will become apparent in the context of the systems and methods disclosed herein.

B. Systems and Methods of Exchange Rate-Limiting

Figure 2:
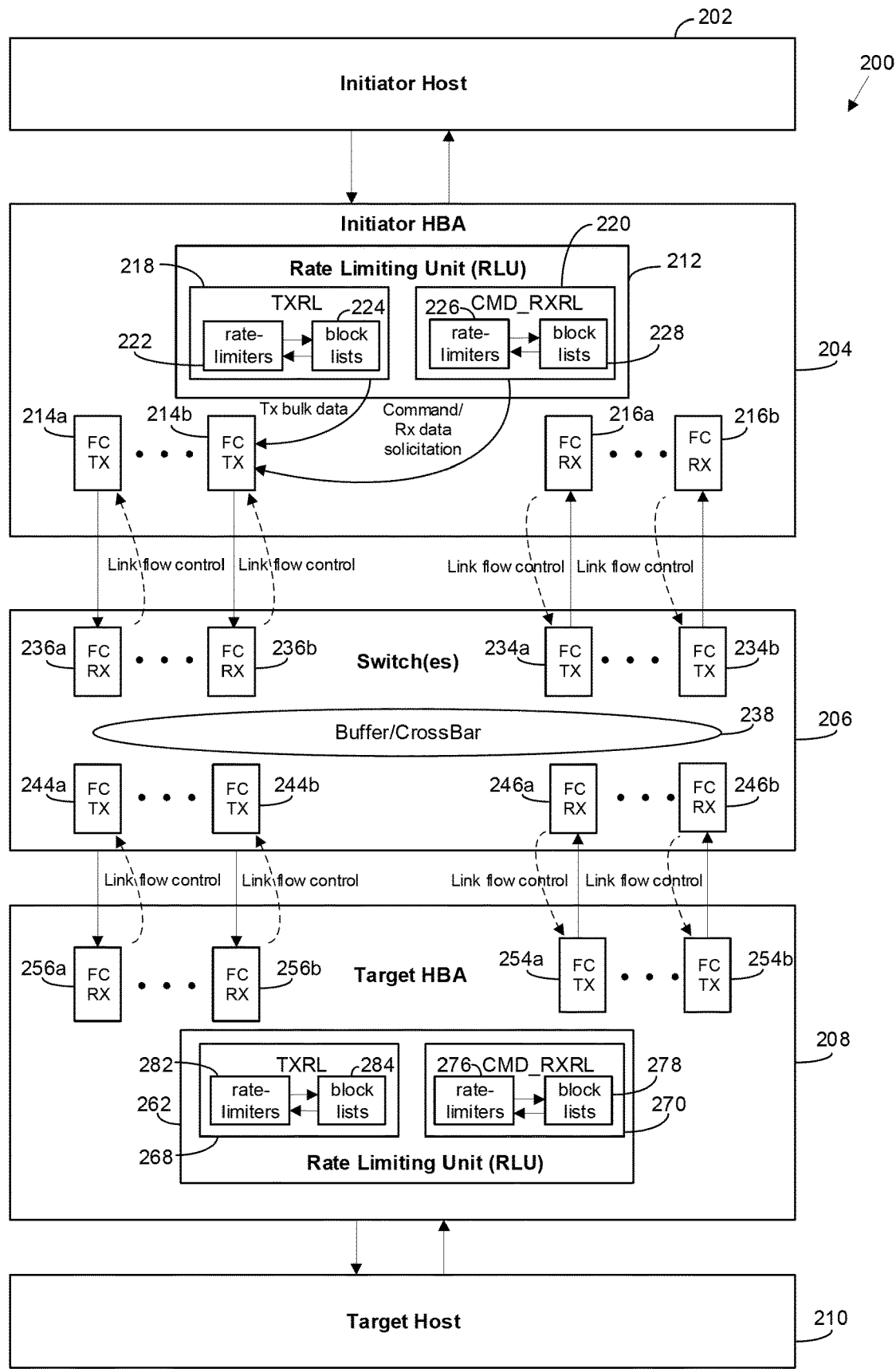
FIG. 2 is a block diagram of a network configured to use congestion reduction techniques according to some embodiments.

With reference to FIG. 2, a network 200 includes an initiator host 202, an initiator host bus adaptor (HBA) 204, switched network 206, a target HBA 208, and a target host 210. The network 200 is arranged as an FC SAN in some embodiments. The network 200 can utilize link-level flow control and host CPU/software/drivers to limit the number of commands outstanding or to control the queue depth in some embodiments. In addition, host CPU/software/driver is configured to coordinate traffic between connections without affecting performance due to limits on CPU overhead in some embodiments.

The network 200 can be utilized with the computing and communication components described above with respect to FIGS. 1A-C. For example, computer system 100 or communication devices 102 can be a target host 210 or initiator host 202. The network 200 is a high-speed network that connects initiator host 202 to target host 210 (e.g., a high-performance storage subsystem). The network 200 can access storage processors (SPs), and storage disk arrays (e.g., target host 210) in some embodiments. The network 200 can use FC protocol to package SCSI commands into FC frames in some embodiments. When transferring data between the initiator host 202 and the target host 210, network 200 can utilize multi-pathing to provide more than one physical path from the initiator host 202 and the target host 210 via the switched network 206.

The initiator HBA 204 and target HBA 208 are line cards, mezzanine cards, motherboard devices, or other devices and are configured according to SCSI, FC and serial AT attachment (SATA) protocols in some embodiments, Initiator HBA 204 includes a rate limiting unit 212, and the target HBA 208 includes a rate limiting unit 262. Initiator HBA 204 includes transmitter ports 214a-b and receiver ports 216a-b. Ports 214a-b and ports 216a-b can be any number for 1 to N. Target HBA 208 includes transmitter ports 254a-b and receiver ports 256a-b. Ports 254 a-b and ports 256a-b can be any number for 1 to N. The rate limiting units 212 and 262 advantageously are configured to perform rate limiting for commands, receive data solicitations and transmit data bulk transfers without host system intervention (e.g., from initiator host 202 or target host 210) in some embodiments. In some embodiments, initiator HBA 204 and target HBA 208 are FC HBAs implemented as an ASIC as a multi-function PCI-Express Gen 4 device, with connectivity at 4×64 gigabyte fibre channel (GFC) full line-rate. The ASIC can provide limiting and host backing store with service level interface (SLI) versions and protocol offloads for a fibre connection (FICON) command mode and fibre channel protocol (FCP) (e.g., SCSI, non-volatile memory express (NVMe) and FICON).

The switched network 206 includes receive ports 236a-b, transmit ports 234a-b, transmit ports 244a-b, receive ports 246a-b, and a buffer or cross bar switch 238. Ports 234a-b, ports 244a-b, ports 236a-b and ports 246a-b can be any number for 1 to N. Ports 236a-b are in communication with ports 214a-b, and ports 234a-b are in communication with ports 216a-b. Ports 236a-b are in communication with ports 244a-b via cross bar switch 238, and ports 234a-b are in communication with ports 246a-b via the cross bar switch 238. Ports 244a-b are in communication with ports 256a-b, and ports 246a-b are in communication with ports 254a-b. The switched network 206 is a fabric switched network, arbitrated loop network, or point-to-point network in some embodiments. Ports 236a-b, 234a-b, 244a-b, and 246a-b can be associated with servers, hubs, switches, routers, directors, nodes or other devices. The switched network 206 can include the physical layer, interconnect devices, and translation devices.

The buffer or cross bar switch 238 can be two unidirectional switches or a bidirectional switches configured to interconnect ports 236a-b with ports 244a-b and ports 234a-b with ports 246a-b. The cross bar switch 238 can include a matrix of switches and include buffers and other communication and interface circuitry. Each of ports 214a-b, 216a-b, 234a-b, 236a-b, 244a-b, 246a-b, 254a-b, and 256a-b can have a unique addressable identifier. Each of ports 214a-b, 216a-b, 234a-b, 236a-b, 244a-b, 246a-b, 254a-b, and 256a-b can be associated with a network node and a pair of ports 214a-b, 216a-b, 234a-b, 236a-b, 244a-b, 246a-b, 254a-b, and 256a-b can be associated with a network link.

Rate limiting units 212 and 262 are configured to reduce congestion in the network 200. Congestion can be caused by a network node or link carrying more data than it can handle and can result in overall reduced network throughput for other devices using the network 200. Rate limiting units 212 and 262 employ techniques to rate-limit input/output (I/O) exchanges to eliminate traffic congestion (e.g., command receive rate limiting (CMD_RxRL) and transmit rate limiting (TxRL) in some embodiments. For example, rate limiting units 212 and 262 can be configured to reduce or eliminate receive (Rx) oversubscription which occurs when a device in network 200 solicits more data (e.g., via read commands as an initiator or transfer ready's (XFER RDY'S) commands as a target) than the device can absorb at the receive link rate. As a result, traffic associated with the requesting link backs up other traffic in the switched network 206, thereby creating network congestion. In another example, rate limiting units 212 and 262 can be configured to reduce or eliminate bully situations which occur when fast targets are paired with local ports of a switch and over-utilize local switch frame buffer resources of the switch such that the other ports sharing the switch have their bandwidth restricted, even if there is not congestion in the switched network 206. In another example, rate limiting units 212 and 262 can be configured to reduce or eliminate command (CMD) overrun which occurs when a target device (e.g., target host 210) is unable to process commands received in receive queue (RQs) fast enough resulting in the target device using link back-pressure to reduce the rate, which also reduces normal I/O exchange flow and generates congestion in the network 200. In yet another example, rate limiting units 212 and 262 can be configured to reduce or eliminate transmit (Tx) over-utilization which arises when a device transmits frames at a data rate higher than the peer node or any node/link in the fabric/network can accept, causing the network 200 to be congested.

Rate limiting unit 212 includes a CMD RxRL unit 220 including rate limiters 226 and block lists 228 and includes a TxRL unit 218 including rate limiters 222 and block lists 224. Rate limiting unit 262 includes a CMD RxRL unit 270 including rate limiters 266 and block lists 278 and includes a TXRL, unit 268 including rate limiters 282 and block lists 284. In some embodiments, rate limiting units 212 and 262 are configured to ensure that necessary ordering constraints are followed when commands or data are withheld from transmission but are later allowed to resume transmission. I/O commands bound to the same remote port are transmitted in the order originally queued where possible (protocols have command-order relationships that may be impacted) in some embodiments. In some embodiments, rate limiting units 212 and 262 are configured so that a transmit sequence operation, interrupted due to Tx rate limits, are resumed before another sequence to the same remote FC port is started, thereby reducing or eliminating the adverse impact on port performance due to multiplexing between multiple open concurrent sequences.

CMD RXRL modules or units 220 and 270 support command limiting, Rx rate limiting and monitoring. Each feature can be enabled or disabled independently in some embodiments. CMD RXRL units 220 and 270 constrain the number of commands (e.g., Max_CmdCnts) that can be inflight at any given time (e.g., command limiting) in some embodiments. Read-based, write-based, or control (no data payload) I/O commands from the initiator host 202, which can be from multiple protocols such as SCSI or NVMe, can be restricted via command limiting. CMD RXRL units 220 and 270 limit the command Receive Queue (RQ) loading on the remote FC port in some embodiments.

CMD RXRL units 220 and 270 perform Rx rate limiting by regulating the number of I/O data bytes that can be solicited over a timer interval with a maximum outstanding burst byte limit. The limit may be per I_T nexus (initiator and target nexus/connection) (SourceID,& DestinationID pair) as a remote port, fabric link(s), fabric speed group, or a combination of the items. CMD RXRL units 220 and 270 prevent oversubscription of receive link rates, thereby reducing or preventing back up into network 206, which can lead to fabric congestion and frames being discarded. Rx rate limiting applies to requests for receive data such as a read command by initiator host 202 that is a SCSI or NVMe initiator or a XFER_RDY command by target host 210 that is a SCSI target or NVMe controller. CMD RXRL units 220 and 270 each perform two Rx rate limiting techniques that are applied simultaneously in some embodiments. The two techniques include Rx rate limiting over a timer interval and Rx rate limiting with a maximum outstanding burst byte limit.

Rx rate limiting over a timer interval provides a maximum number of bytes (Max_Totalbytes) that can be solicited over a period of time (e.g., 100 ms window). The number of bytes allowed is calculated based on link speed, fabric speed group, or other metric. The timer interval is programmable. For example, a 64GFC link can send 6400 MB/s, thus a 100 ms window can send 640 MB. Whenever an I/O request is started, the I/O length is consumed from the window. As soon as the bytes for the window are exhausted, further I/O requests are delayed until the timer interval expires, then the timer begins again.

Rx rate limiting with a maximum outstanding burst byte limit specifies the maximum number of bytes (Max_Burstbytes) that can be outstanding at any given time. Once the outstanding burst byte limit has been reached, units 212 and 262 stop soliciting read data. Rather than resuming solicitations as soon as the outstanding Rx bytes falls below Max_Burstbytes, the units 212 and 262 resume solicitation only when the outstanding Rx bytes falls below a percentage of the maximum number of bytes. The resume burst byte percentage threshold is programmable. In some embodiments, the threshold defaults to half of the maximum outstanding burst byte limit. By limiting the amount of Rx data outstanding and waiting for a percentage to be received before resuming, solicitations are paced throughout the time interval (vs all up front as soon as possible) and creates gaps in the Rx stream for the local port. The gaps reduce consumption levels of frame buffering resources in the local switch, allowing other FC ports sharing the switch to utilize available bandwidth.

Example 1

Figure 3:
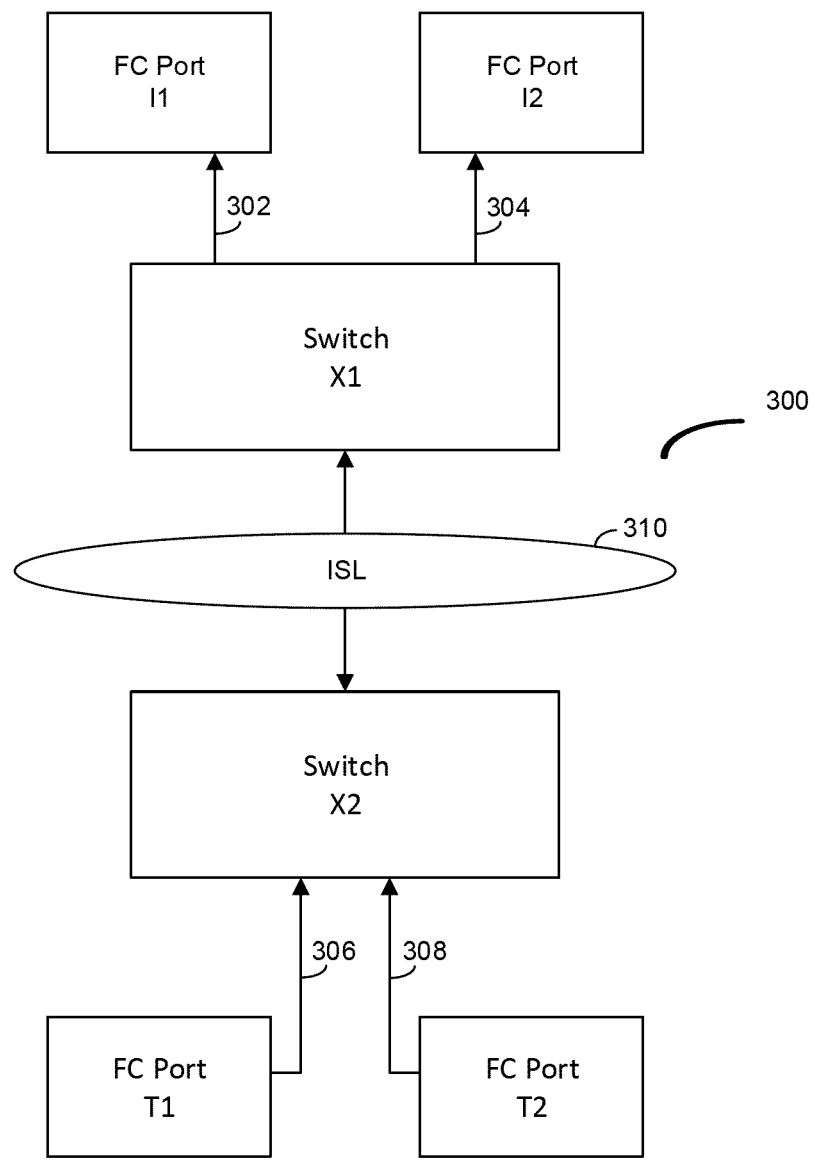
FIG. 3 is a block diagram showing exemplary communication flow in a network similar to the network illustrated in FIG. 3 according to Example 1 of the specification.

With reference to FIG. 3, a network 300 is similar to network 200 (FIG. 2). FC port I1 of network 300 is a local FC port coupled to a switch X1 via a link 302 with speed S1. An FC port I2 is a peer FC port also coupled to switch X1 via a link 304 with speed S1. A FC port T1 is a FC remote port connected to a switch X2 via a link 306 with link speed S2 where (S2=2*S1), and a FC port T2 is a FC remote port connected to switch X2 via a link 308 with link speed S1. Switch X1 and switch X2 are connected via inter switch links (ISL) 310. A flow A exists between FC port I1 and FC port T1, and a flow B exists between FC port I2 and FC port T2. If flows A and B are sustained, given the speed difference between FC port T1 and FC port T2, FC port T1 passes two times the number of frames into the ISL 310, resulting in FC port I1 seeing two times the bandwidth of FC port I2 due to the feed rate into the local switch frame buffer resources. With sustained flows, the frame buffer resources are fully consumed continuously with frame rates at this 2:1 ratio.

Flow A is considered a bully as it reduces flow B. If a bandwidth cap is placed on flow A such that the sustained flow of flow A is suspended after 70% of the time window, the bandwidth of FC Port I1 is: (S1*0.7) and FC Port I2 is ((S1/2)*0.7)+(S1*(1−0.7))). If flow A utilizes the outstanding burst limit, although there are some points where the local switch frame buffer resources is fully utilized with the 2:1 ratio, there are other times where it is not fully utilized and the ratio drops (e.g., to 1.75:1 (the 1.75 varies but is less than 2 in some embodiments)). As such, the bandwidth seen by FC Port I2 is increased due to the more equal ratio while FC Port I1 continues to see the same bandwidth. The burst distributed bandwidth of the FC port T1 is displaced over the time window rather than being all at the front of the time window and monopolizing switch frame buffer resources. Units 212 and 262 (FIG. 2) monitor and adjusts the Rx flow to maintain a burst limit and resumption percentage that optimally spaces the gaps but still maintains the desired rate in some embodiments.

With reference to FIG. 2, monitoring provides statistics gathered over a timer interval to the hosts 202 and 210. The statistics collected per rate limiter are maximum outstanding read byte count, total number of read bytes requested, total number of read bytes completed, average I/O size, average I/O latency and so on. On every statistic timer interval, HBA 208 and HBA 204 direct memory accesses a set of monitoring statistics to hosts 202 and 210 via a circular Statistic Queue per peripheral comment interconnect function.

When a command (e.g. a read command from initiator host 202; a write command from initiator host 202; or transfer ready (XFER_RDY) from target host 210 (e.g., a SCSI or NVMe target)) is received, the HBA 204 and 208 query CMD_RxRL units 220 and 270 (e.g., on-chip) to determine if there is Rx bandwidth available to receive based on the metrics being maintained (per remote FC port, FC Link rate, etc.).

An exemplary protocol mechanism for network 200 is discussed below in more detail. The protocol mechanism can use a Current_Totalbytes field, a Max_Totalbytes field, a Current_Burstbytes field, Max_Burstbytes field, a Burstbytes_Hysteresis field, a Current_CmdCnts field, and a CmdCnts_Hysteresis_Met field. According to the protocol mechanism, if the receive link bandwidth is available (e.g., (Current_Totalbytes<Max_Totalbytes) and (Current_Burstbytes<Max_Burstbytes) and Burstbytes_Hysteresis_Met is asserted)), the command (or transfer ready) is delivered to the remote FC port (e.g., ports 256a-b or ports 216a-b). The associated rate limiting contexts are updated with resources consumed accordingly. The Current_Totalbytes field is added with the number of data bytes solicited. The Current_Totalbytes field is reset to zero at the end of every timer interval. The Current_Burstbytes field is added with the number of data bytes solicited. The Current_Burstbytes field is subtracted with the number of data bytes returned during I/O operation completion.

The Burstbytes_Hysteresis_Met field is asserted initially until (Current_Burstbytes>=Max_Burstbytes), then the Not Burstbytes_Hysteresis_Met field is deasserted. After the Burstbytes_Hysteresis_Met field is deasserted, the Not Burstbytes_Hysteresis_Met field remains deasserted until (Current_Burstbytes<=Max_Burstbytes/2) with a 50% burst byte resume threshold setting, the Not Burstbytes_Hysteresis_Met field is asserted, thereby providing hysteresis and reducing cycling.

If the receive link bandwidth is exhausted ((e.g., Current_Totalbytes>=Max_Totalbytes) or (Current_Burstbytes>=Max_Burstbytes) or Not Burstbytes_Hysteresis_Met), the command (or transfer ready) is queued-up in the RPI_RxQ block list (e.g., block list 228 or 278) of the remote FC Port (e.g. ports 256a-b). The RPI_RxQ block list mechanism is designed to preserve the order in which the bandwidth is consumed per remote FC Port. In addition, RPI_RxQ block list mechanism facilitates non-blocking arbitration between multiple remote FC Ports when processing queued commands from the different RPI_RxQ block lists.

Rate limiting units 212 and 262 provide the ability to limit the number of commands (e.g., a read based command, write-based command; or control (no data payload) command as an initiator) that can be concurrently inflight to a remote FC Port. Limiting the commands alleviates receive queue (RQs) over-runs on the remote FC Port which may result in delayed FC buffer-to-buffer (BB) credit-return which may drop to a level that do not return credits at a rate that is required to sustain link bandwidth.

According to the exemplary protocol mechanism, the command count resource must be available ((Current_CmdCnts<Max_CmdCnts) and CmdCnts_Hysteresis_Met)) to allow a command to be transmitted. The associated rate limiting contexts are updated with resources consumed accordingly. Current_CmdCnts field is incremented by one for the command sent. Current_CmdCnts field is decremented by one when a command completes.

The resume command count threshold mechanism can be applied which is analogous to the resume burst byte threshold method described above and can provide hysteresis. For example, with a 50% command count resume threshold, the command count grant is allowed again (with CmdCnts_Hysteresis_Met field asserted) when the condition (Current_CmdCnts<=Max_CmdCnts/2) is met, and the CmdCnts_Hysteresis_Met field stays asserted until (Current_CmdCnts>=Max_CmdCnts) in some embodiments. By default, this feature is disabled, which means CmdCnts_Hysteresis_Met field is asserted high.

CMD_RxRL units 220 and 270 implement a number of rate limiting contexts to track bandwidth consumption. Each rate limiting context (e.g., in rate limiters 226 and 276) maintains a number of data bytes consumed (Current_Totalbytes) over a timer interval as well as a number of data bytes outstanding (Current_Burstbytes) (i.e., data bytes solicited waiting for return of the solicited data) in addition to the number of commands outstanding (Current_CmdCnts) (commands solicited waiting for the completion of the command) in some embodiments. The maximum limits (Max_Totalbytes, Max_Burstbytes and Max_CmdCnts) are also programmed in rate limiting contexts. Given the multiple Rx metrics possible (per remote FC port, fabric link speed, speed group, etc.), the protocol mechanism supports a remote FC port associating with up to three Rx rate limiters. Any of the rate limiters (e.g., rate limiters 226 and 276) can be enabled or disabled independently. All enabled rate limiters queried for a command must all pass the rate limiting checks before the data bytes/command resources can be consumed and the command is committed for transmission in some embodiments. An example of a combination of rate limiters 226 and 276 is as follows:

Rate Limiter 1: meters command/bandwidth specific to the remote FC port.

Rate Limiter 2: collects and limits command/bandwidth for a group of remote FC ports or a fabric speed group.

Rate Limiter 3: measures and constrains command/bandwidth for all data traffic traverse through a given physical FC port.

CMD_RxRL units 220 and 270 arbitrate queued commands from the RPI_RxQ block lists (e.g., block lists 228 and 278) to determine if the queued commands are eligible for delivery with bandwidth available and/or within command outstanding limit of the associated rate limiting contexts. If a new incoming command is received and the associated RPI_RxQ block list is not empty, the new command is queued at the tail of the RPI_RxQ block list for in order processing and fairness in some embodiments.

When an I/O operation is complete, CMD_RXRL units 220 and 270 subtract/update the outstanding command count (e.g., Current_CmdCnts field) and/or burst byte count e.g., Current_Burstbytes field) in rate limiting contexts as the command is no longer inflight.

TxRL rate limiting modules or units 218 and 268 provide Tx rate limiting and monitoring. Tx rate limiting restricts the number of I/O data bytes (e.g., Max_Totalbytes field) that can be transmitted over a period of time to match the speed of the Rx link on the receiving remote FC Port as well as any inter-switch links (ISLs) along the path. Tx rate limiting can be applied to any type of data transmit from the local FC port to a remote FC port. For example:

1. When the initiator host (e.g., host 202) is a SCSI or NVMe initiator, Tx rate limiting can be applied to the transmission of I/O Write data or Request data passed from the host to the remote FC port target; or 2. When the host is a SCSI or NVMe target, Tx rate limiting can be applied to the transmission of I/O Read data or Response data passed from the remote FC port target to the host.

According to an exemplary protocol mechanism, Tx rate limiting may be applied to various types of other traffic such as protocol Link Services, CT requests and responses, etc. that are transmitted from the local port to the remote FC port.

Monitoring provides Tx statistics to the initiator host 202. The statistics collected per rate limiter are total number of requests, bytes requested, granted and transmitted. On every statistic timer interval, the HBA 204 and 208 direct memory accesses a set of monitoring statistics to initiator host 202 via a circular per PCI function.

According to an exemplary protocol mechanism, when a bulk data transmit request (a Transfer Ready for an initiator I/O write command; a Read data transmit request as a target; or a sequence transmit operation for a CT operation) is received from the link or the host, the HBA 204 or 208 queries a respective TxRL unit 218 or 268 (e.g., on-chip) to determine if there is Tx bandwidth available based on the metrics being maintained (per remote FC port, FC Link rate, etc.). If the Tx bandwidth is available (Current_Totalbytes<Max_Totalbytes), the bulk data is transmitted. The associated rate limiting contexts are updated with resources consumed accordingly. Current_Totalbytes field is added with the number of data bytes transmitted. Current_Totalbytes field is reset to zero at the end of every timer interval.

If the Tx bandwidth is exhausted (Current_Totalbytes>=Max_Totalbytes), the bulk data request is queued-up in the RPI_TxQ block lists (e.g., block lists 224 and 284) According to the exemplary protocol, the RPI_TxQ block list mechanism preserves the order in which the bandwidth is consumed per remote FC port. In addition, the RPI_TxQ block list mechanism facilitates non-blocking arbitration between multiple remote FC ports when processing queued requests from the different RPI_TxQ block lists (e.g., block lists 224 and 284).

TxRL units 218 and 268 implement a number of rate limiting contexts to track Tx bandwidth consumption (Current_Totalbytes). The maximum limit (Max_Totalbytes) is also programmed in the rate limiting context. Each rate limiting context maintains a number of data bytes consumed over a timer interval. Given the multiple Tx metrics possible (per remote FC port, fabric link speed, speed group, etc.), the protocol mechanism supports a remote FC port associating with up to two Tx rate limiters in some embodiments. Any of the rate limiters (e.g., rate limiters 226 and 266) can be enabled or disabled independently. All enabled Tx rate limiters queried for a request must all pass the rate limiting checks before the data byte resources can be consumed and the request is committed for transmission. An example of a combination of rate limiters 226 and 266 is as follows:

1. Rate Limiter 1: meters bandwidth specific to a remote FC Port; and

2. Rate Limiter 2: collects and limits bandwidth for a group of remote FC Ports or a fabric speed group.

TxRL units 218 and 268 arbitrate queued requests from RPI_TxQ block lists (e.g., block lists 224 and 284) to determine if the queued requests are eligible for delivery with bandwidth available of the associated rate limiting contexts. If a new incoming request is received and the associated RPI_TxQ block list is not empty, the new request is queued at the tail of the RPI_TxQ block list for in order processing and fairness in some embodiments.

Rate limiting units 212 and 262 manage respective block lists 224, 228, 284 and 278 for enqueuing and dequeuing requests that have been rate limited. Block lists 224, 228, 278, and 284 can be memory, storage, or other devices for storing data queues. The block list mechanism is composed of one RPI_RxQ queue and one RPI_TxQ queue per remote FC Port. The queues are used to preserve request order for bandwidth consumption as well as to avoid blocking between multiple remote FC ports. A RPI_RxQ or RPI_TxQ queue is constructed with a head pointer, a tail pointer and a valid bit in internal structure maintained for the remote FC port in some embodiments. Each internal FC exchange structure, the context for which a command or Rx or Tx solicitation must be related to, contains a next pointer field. The queue head pointer contains a reference to the current FC exchange that is to be processed for the remote FC port. The FC exchange structure next pointer in the current FC exchange links to the next exchange to be processed for the remote FC port and so on for remaining FC exchange structures. When the processing of the current exchange is complete, the FC exchange structure next pointer is copied to the queue head and processing starts on the new current FC exchange. The queue tail pointer indicates the last FC exchange structure on the queue. When a new FC exchange is being added to the queue, the next pointer field in the last FC exchange structure is updated to point to the new exchange structure and the tail pointer in the queue context is updated to point the new FC exchange structure.

Cellular networks, satellite communications, vehicle communication networks, and other non-802.11 wireless networks can utilize the systems and methods described herein to achieve congestion reduction without departing from the scope of the systems and methods described herein.

It should be noted that certain passages of this disclosure may reference terms such as "first" and "second" in connection with devices, number of bits, transmission durations, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of communicating in a network, wherein read commands for an input output (IO) exchange are provided via the network from a local transmit port, wherein the read commands request data to be received on a local receive port via the network, the method comprising:
   providing a first read command to a rate limiting unit;
   withholding for at least a first period of time the first read command from being provided to the local transmit port in response to the rate limiting unit determining a maximum number of bytes that can be solicited over the first period of time is exceeded by a total number of bytes solicited or if a total number of bytes outstanding is greater than a maximum number of bytes outstanding; and
   providing the first read command and adding a number of bytes solicited by the first read command to the total number of bytes solicited for reception on the local receive port at least partially in response to the rate limiting unit determining the maximum number of bytes that can be solicited over the first period of time is not exceeded by the total number of bytes solicited and the total number of bytes outstanding being less than maximum number of bytes outstanding, wherein the total number of bytes solicited is reset to zero in response to the first period of time expiring.

2. The method of claim 1, further comprising:
   withholding the first read command in response to a hysteresis parameter associated with the total number of bytes outstanding.

3. The method of claim 2, wherein the rate limiting unit determines the maximum number of bytes that are outstanding over a second period of time is exceeded using hysteresis.

4. The method of claim 2, wherein the rate limiting unit uses a current total byte field, a maximum total byte field, a current burst byte field, a maximum burst byte field, and a burst byte hysteresis field.

5. The method of claim 2, wherein the maximum number of bytes that are outstanding is per port, per switch or link, per speed group, or combination thereof.

6. The method of claim 2, the method is performed on a host bus adapter disposed at least in part on an application specific integrated circuit (ASIC).

7. The method of claim 1, wherein the maximum number of bytes is per port, per switch or link, per speed group, or combination thereof.

8. The method of claim 1, wherein the network is a fiber channel storage area network.

9. A host bus adapter for a storage network, comprising:
   a rate limiting unit configured to perform rate limiting for an input output (IO) exchange in response to:
      a maximum number of bytes that can be solicited over a first period of time being exceeded by withholding an IO command from being provided to a local transmit port if the rate limiting unit determines the maximum number of bytes that can be solicited over the first period of time is exceeded or if a total number of bytes outstanding is greater than a maximum number of bytes outstanding, wherein the IO command is provided and a number of bytes solicited by the IO command is added to a total number of bytes solicited at least partially in response to the rate limiting unit determining the maximum number of bytes that can be solicited over the first period of time is not exceeded by the total number of bytes solicited and the total number of bytes outstanding being less than a maximum number of bytes outstanding, wherein the total number of bytes solicited is reset to zero when the first period of time expires.

10. The host bus adapter of claim 9, wherein the rate limiting unit is configured to perform rate limiting in response to a hysteresis parameter.

11. The host bus adapter of claim 10, wherein the rate limiting unit, wherein the maximum number of bytes that can be solicited over the first period of time is related to bytes received by the receive port associated with the IO command, related to bytes transmitted by the transmit port associated with the IO command, related to bytes provided over a link, or related to bytes provided over a link group.

12. The host bus adapter of claim 9, wherein the rate limiting unit determines the maximum number of bytes that are outstanding over a second period of time is exceeded using hysteresis.

13. The host bus adapter of claim 9, wherein the rate limiting unit comprises:
   a current total byte field;
   a maximum total byte field;
   a current burst byte field;
   a maximum burst byte field; and
   a burst byte hysteresis field.

14. The host bus adapter of claim 9, wherein the rate limiting unit determines the maximum number of bytes per port, per switch or link, per speed group, or combination thereof.

15. The host bus adapter of claim 9, wherein the rate limiting unit is a fiber channel rate limiter.

16. The host bus adapter of claim 9, wherein the rate limiting unit comprises a plurality of rate limiters and a plurality block lists.

17. A host bus adapter for a storage network, comprising:
a rate limiting unit comprising a receive rate limiter and a transmit rate limiter, wherein the receive rate limiter is configured to perform receive rate limiting for an input output (IO) exchange in response to:
a maximum number of bytes that can be solicited over a first period of time being exceeded by withholding an IO command from being provided to a local transmit port in response to the maximum number of bytes that can be solicited over the first period of time being exceeded if the IO command is provided or if a total number of bytes outstanding is greater than a maximum number of bytes outstanding, wherein the IO command is provided and a number of bytes solicited by the IO command is added to a total number of bytes solicited at least partially in response to the rate limiting unit determining the maximum number of bytes that can be solicited over the first period of time is not exceeded by the total number of bytes solicited, wherein the total number of bytes solicited is reset after the first period of time expires; and
wherein the transmit rate limiter is configured to perform transmit rate limiting in response to a maximum number of bytes that can be transmitted over a second period of time exceeding a speed of a receive link.

18. The host bus adapter of claim 17, wherein the rate limiting unit is a fiber channel rate limiter.

19. The host bus adapter of claim 17, wherein the transmit rate limiter and the receive rate limiter each comprise a plurality of rate limiters and a plurality block lists.

20. The host bus adapter of claim 17, wherein the speed of the receive link is associated with a remote port, a group of ports or a fabric speed port.

21. A host bus adapter for a storage network, comprising:
a receive rate limiter is configured to perform receive rate limiting in response to a maximum number of bytes that can be solicited over a first period of time being exceeded by withholding an input output (IO) command associated with an IO exchange from being provided to a local transmit port in response to the maximum number of bytes that can be solicited over the first period of time being exceeded if the IO command is provided, wherein the IO command is provided and a number of bytes solicited by the IO command is added to a total number of bytes solicited at least partially in response to the receive rate limiter determining the maximum number of bytes that can be solicited over the first period of time is not exceeded by the total number of bytes solicited and the total number of bytes outstanding being less than a maximum number of bytes outstanding, wherein the total number of bytes solicited is reset to a lower number after the first period of time expires; and
a rate limiting unit comprising a transmit rate limiter, wherein the transmit rate limiter is configured to perform transmit rate limiting in response to a maximum number of bytes that can be transmitted over a second period of time exceeding a speed of a receive link, or any node or link through a network/fabric associated with the host bus adapter.

\* \* \* \* \*